United States Patent
Burrows

(10) Patent No.: US 7,211,530 B2
(45) Date of Patent: May 1, 2007

(54) FIBROUS VEIL FOR CLASS A SHEET MOLDING COMPOUND APPLICATIONS

(75) Inventor: Robert D. Burrows, Bradford (GB)

(73) Assignee: Owens-Corning Fiberglas Technology, Inc., Summit, IL (US)

( * ) Notice: Subject to any disclaimer, the term of this patent is extended or adjusted under 35 U.S.C. 154(b) by 113 days.

(21) Appl. No.: 10/670,039

(22) Filed: Sep. 24, 2003

(65) Prior Publication Data

US 2005/0064166 A1   Mar. 24, 2005

(51) Int. Cl.
*B32B 17/02* (2006.01)
*D04H 1/00* (2006.01)

(52) U.S. Cl. .................................. 442/180; 428/292.1

(58) Field of Classification Search ................. 428/290, 428/285, 304.4, 319.7, 288, 301, 302, 303, 428/314.4, 313.5, 292.1; 442/180
See application file for complete search history.

(56) References Cited

U.S. PATENT DOCUMENTS

| | | | |
|---|---|---|---|
| 3,963,820 A * | 6/1976 | Blakey | 264/134 |
| 4,579,774 A * | 4/1986 | Kuwazuru et al. | 428/300.4 |
| 4,716,062 A | 12/1987 | Klein | |
| 4,923,547 A * | 5/1990 | Yamaji et al. | 156/181 |
| 5,047,288 A | 9/1991 | Hoshiro et al. | |
| 5,258,089 A | 11/1993 | Tanaka et al. | |
| 5,698,302 A * | 12/1997 | Brandon et al. | 428/215 |
| 5,698,304 A * | 12/1997 | Brandon et al. | 428/215 |
| 6,054,177 A | 4/2000 | Endoh et al. | |
| 6,120,873 A * | 9/2000 | Grant et al. | 428/74 |
| 6,139,956 A | 10/2000 | Endoh et al. | |
| 6,197,242 B1 | 3/2001 | Parks et al. | |
| 6,497,787 B1 | 12/2002 | Geel | |
| 6,627,024 B2 * | 9/2003 | Lane | 156/157 |
| 6,743,522 B2 * | 6/2004 | Bean et al. | 428/500 |
| 6,746,974 B1 * | 6/2004 | Reiterer et al. | 442/101 |
| 7,037,863 B2 * | 5/2006 | Doh et al. | 438/785 |

FOREIGN PATENT DOCUMENTS

| | | |
|---|---|---|
| EP | 0 390 193 | 3/1990 |
| JP | 62018216 | 1/1987 |
| JP | 2 099657 | 11/1990 |

* cited by examiner

*Primary Examiner*—N. Edwards
(74) *Attorney, Agent, or Firm*—Inger H. Eckert; Margaret S. Millikin

(57) ABSTRACT

A conformable veil is formed by impregnating a random mat of glass fibers formed with a polystyrene-based resin. The veil is then introduced between two layers of a sheet molding compound resin paste and compacted to form a compacted sheet. The compacted sheet is then introduced to a mold and molded to form a soft, flexible sheet molding composite part having good resin and fiber distribution. Resin and fiber distribution of the present invention is improved because the polystyrene-based resin is soluble in the sheet molding compound resin paste and allows the plurality of fibers to flow freely within the resin paste during the molding process.

27 Claims, 2 Drawing Sheets

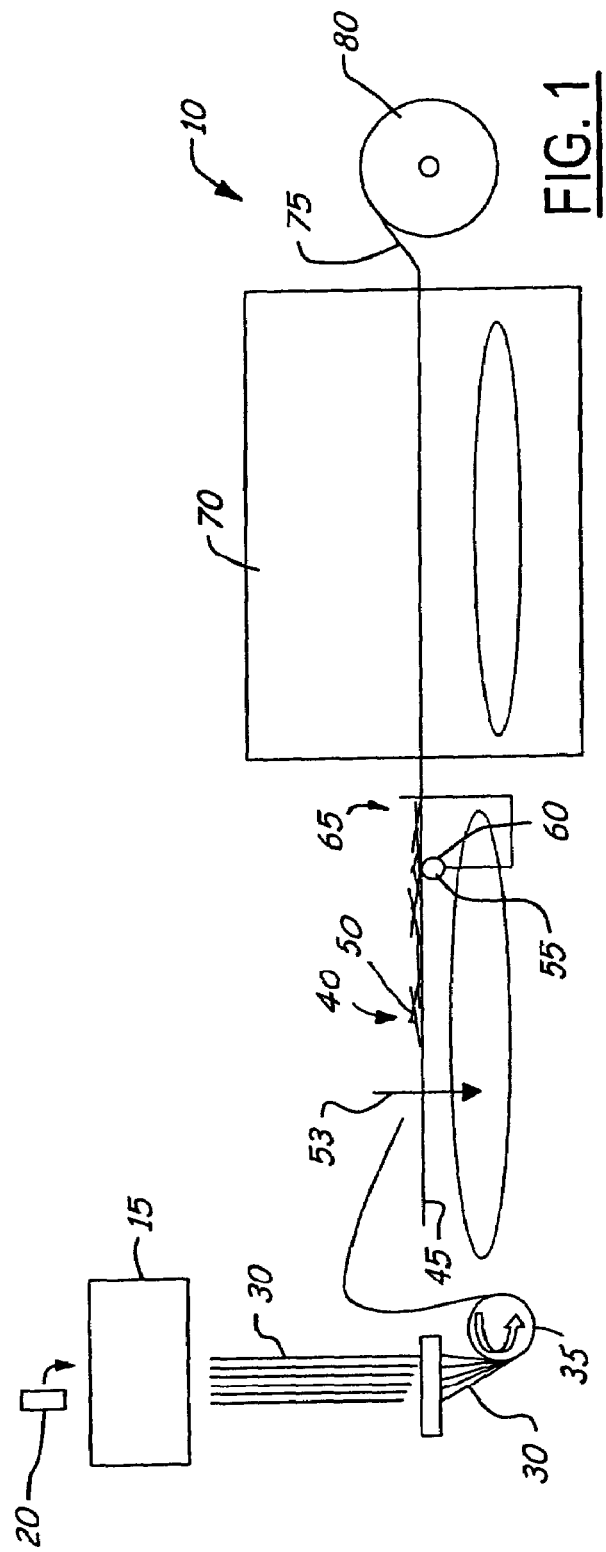
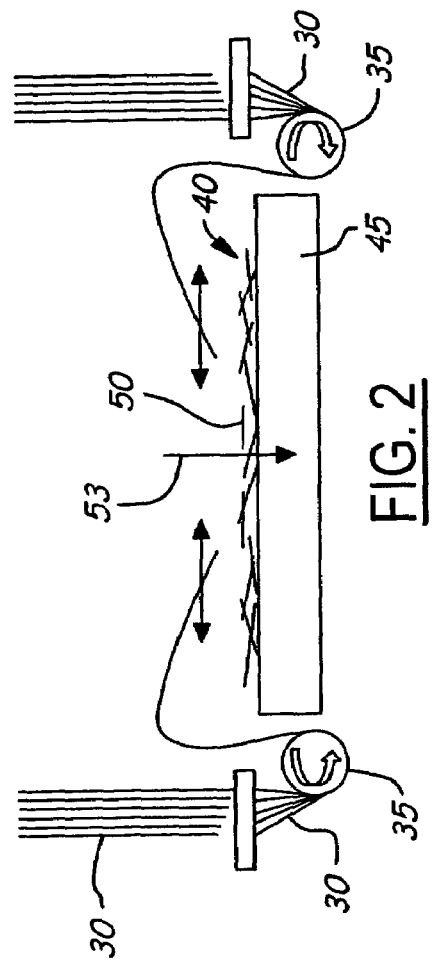

FIBROUS VEIL FOR CLASS A SHEET MOLDING COMPOUND APPLICATIONS

TECHNICAL FIELD AND INDUSTRIAL APPLICABILITY OF THE INVENTION

The present invention relates generally to fiber-reinforced materials and more specifically to a to a dry-laid polystyrene-bound surfacing veil for use in sheet molding compounds.

BACKGROUND OF THE INVENTION

In the manufacture of fiber reinforced resin products, sheet-molding compounds are frequently used. Sheet molding compounds offer an appealing solution for the production of Class A surface parts compared to steel both in terms of cost and coefficients of thermal expansion.

Sheet molding compounds consist of a mixture of a thermosetting resin, a thermoplastic (typically dissolved in styrene) and catalyst, particulate filler and chopped reinforcement fibers, such as glass fibers. In most cases, the resin and chopped fibers are sandwiched between films of plastic material to form a laminated sheet that is wound in rolled form or festooned for storage. The laminated sheet is stored under conditions that will not result in final curing of the resin, but will allow the paste to thicken from typically a 10,000 to 40,000 centipoise (MilliPascal seconds) range to a desired molding viscosity range, typically between 30,000,000 and 50,000,000 centipoise. At the time of use, the protective carrier film is removed and the laminated sheet is cut into blanks, or plies, of a desired shape and size. The plies are then molded to form a cured composite part. In most applications, multiple plies of the laminated sheets are used in the composite structure and typically comprise between 25 and 50% of the die/tool's surface area. When the laminated sheets are molded, the resin and glass flow within the mold under heat and pressure to cover the entire surface of the mold. Sheet molding compounds are used in a variety of applications that require aesthetic appeal, corrosion resistance, lighter weight dimensional control and high strength.

One potential way to produce sheet molding compounds has been to sandwich a wet process textile mat, instead of chopped fibers, between layers of sheet molding compound resin and molding the resultant laminate into a composite part. However, the fiber contained within the wet process textile veil mat does not flow well under pressure. Thus, the composite parts formed by this process have similar poor surface characteristics as composite parts formed with chopped fibers.

It is therefore highly desirable to improve the characteristics of sheet molding compound. This would allow sheet molding compound parts to be used in a wider variety of composite applications wherein surface quality as well as scrap and rework is a concern.

SUMMARY OF THE INVENTION

The present invention is directed to a fibrous web, or veil that is subsequently processed to form a soft, flexible sheet molding composite part having good resin and fiber distribution. The veil is coated with a polystyrene-based resin that is soluble in the sheet molding compound resin paste.

Preferably, fibrous veil is a polystyrene-bound glass fiber mat having a density of approximately 50 grams per square meter. The polystyrene-based binder constitutes about 10 percent of the dry weight of the formed veil and is substantially soluble in the resin component of the sheet molding composite part. The glass fibers length of the glass fibers, preferably between about 1 and 2 meters, helps to ensure that the fibers remain entangled during subsequent introduction within layers of a sheet molding compound, therein contributing loft and strength internally within the compound, yet improving the surface characteristics of the finished composite part.

Other objects and advantages of the present invention will become apparent upon considering the following detailed description and appended claims, and upon reference to the accompanying drawings.

BRIEF DESCRIPTION OF THE DRAWINGS

FIG. 1 is a perspective view of a processing line for forming a veil according to a preferred embodiment of the present invention;

FIG. 2 is a side view of a portion of the processing line of FIG. 1;

DETAILED DESCRIPTION AND PREFERRED EMBODIMENTS OF THE INVENTION

Figure 3:
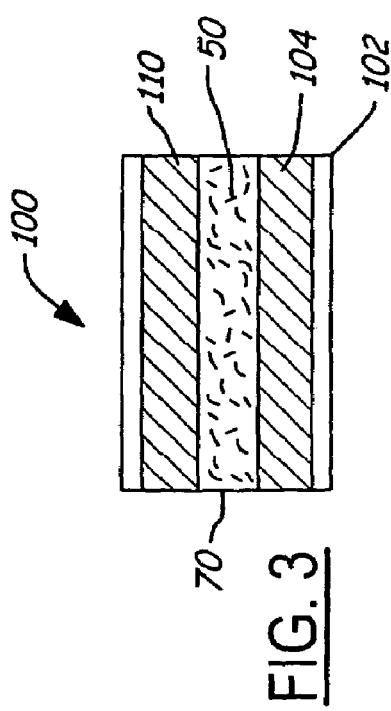
FIG. 3 is a perspective view of a sheet molding composite sheet having the veil of FIG. 1.

Referring now to FIGS. 1 and 2, a preferred dry-laid continuous fiber processing line is generally depicted as 10. One skilled in the art appreciates that the present invention may be made using other methods. To begin the process, glass is melted to form fibers. In a preferred embodiment, glass rods 20, preferably about 2000 mm by 5 mm, are first melted and spun within a conventional device 15 to produce glass fibers 30 having a diameter of between about 11 and 14 micrometers. The fibers 30 are then introduced to oscillating (latitudinal) multiple fiber distribution heads 35; (shown as 2 fiber distribution heads 35 in FIG. 2) that buildup a random mat 40 of chopped glass fibers 50 on a moving perforated conveyor belt 45 with a down draft airflow (shown by arrow 53 on FIGS. 1 and 2). The chopped fibers 50 preferably have an average approximate length souvenir of about 0.25 to 3 meters, more preferably between 0.5 and 2 meters, and more preferably between 1 and 2 meters. Air drawn through the perforated belt 45 is used to allow the chopped fibers 50 to lie down on the conveyor belt 45 to form the random mat 40.

The mat 40 is then impregnated with a binder 55 from a curtain coater 60 or similar application device to form an impregnated mat 65. The impregnated mat 65 is then introduced to an oven 70, or furnace, wherein water is removed. The binder 55 is melted within the oven to glue the fibers 30 together, therein forming a smooth veil 75 of fibers 30. The temperature of the oven 70 is preferably between approximately 100 and 150 degrees Celsius. The veil 75 is removed from the oven 70, cooled, and wound onto a tube 80 for storage or shipment.

The binder 55 preferably is a polystyrene-based binder formed from a water-based polystyrene-based emulsion that constitutes about 10 weight percent of the dry veil 70. The polystyrene-based binder material is substantially soluble in the resinous component (for example, the first and second layer of resin material 104, 110 shown in FIG. 2) of the sheet molding composite parts to which the veil 75 is introduced.

To reduce foaming, a siloxane defoamer is also preferably added to the binder 55. One preferred polystyrene emulsion homopolymer is Vinamul 7700, manufactured by Vinamul Polymers, which is applied as a 3 percent solution in water and containing the siloxane defoamer.

The dry veil 70 may then be subsequently introduced between layers of resin material to form a sheet molding composite sheet. One preferred process for forming a sheet molding composite sheet is described below with reference to FIGS. 3 and 4.

Referring now to FIG. 3, a sheet molding composite sheet 100 is shown as having an upper carrier film 102, a first layer of resin material 104, the veil 70, a second layer of resin material 110, and a lower carrier film 112.

The first layer of resin material 104 and second layer of resin material 110 are typical formulations of sheet molding compound material without fibrous reinforcement as are well known in the art. They consist essentially of polyester and thermoplastic resins, catalyst, internal mold release agents, inorganic fillers, and one or more thickening agents. For example, these resin layers 104, 110 may be prepared having a composition as described below in Table 1. Alternatively, the resin layers 104, 110 could have a composition similar to what is described in U.S. Pat. No. 5,089,544 to Ross et al., which is herein incorporated by reference. A vacuum-degassing device is used to remove air trapped in the paste before application. One such vacuum-degassing device is known as a "Versator", manufactured by The Cornell Machine Company. Alternatively, the trapped air or gas might be removed using a process described in U.S. Pat. No. 6,218,458 to Vidaurre, which is herein incorporated by reference.

TABLE 1

SHEET MOLDING COMPOUND RESIN LAYERS 104, 110

| INGREDI-ENTS | WEIGHT | MANUFACTURER NAME | DESCRIPTION |
| --- | --- | --- | --- |
| T341 | 16.95 | AOC/Alpha Owens Corning | Polyester Resin in Styrene |
| T154 | 7.24 | AOC/Alpha Owens Corning | Thermoplastic Polyester resin in styrene |
| Styrene | 3.13 | Ashland | Styrene monomer |
| DVB | 1.33 | Dow | Divinyl benzene |
| P710 | 0.88 | BASF | Polypropylene oxide |
| PBQ | 0.008 | Aldrich | P-benzoquinone |
| CBA-60 | 0.88 | Witco | Non-ionic |
| 1300 × 40 | 0.59 | B. F. Goodrich | Hycar Rubber in styrene |
| TBPB | 0.53 | Atofina | T-butyl perbenzoate catalyst |
| Cal St | 1.18 | Mallinckrodt | Mold Release Agent |
| Huber 10-4 | 62.02 | Huber | Calcium carbonate |
| RP510 | 1.83 | AOC/Alpha Owens Corning | Thermoplastic polyester resin in Styrene |
| Zn St | 0.15 | Mallinckrodt | Mold release agent |
| PDI-1805 | 0.03 | Ferro | Iron pigment |
| Huber W-4 | 2.66 | Huber | Calcium carbonate |
| CaO | 0.53 | C. P. Hall | Alkaline earth oxide thickener |
| Water | 0.05 | | |

Figure 4:
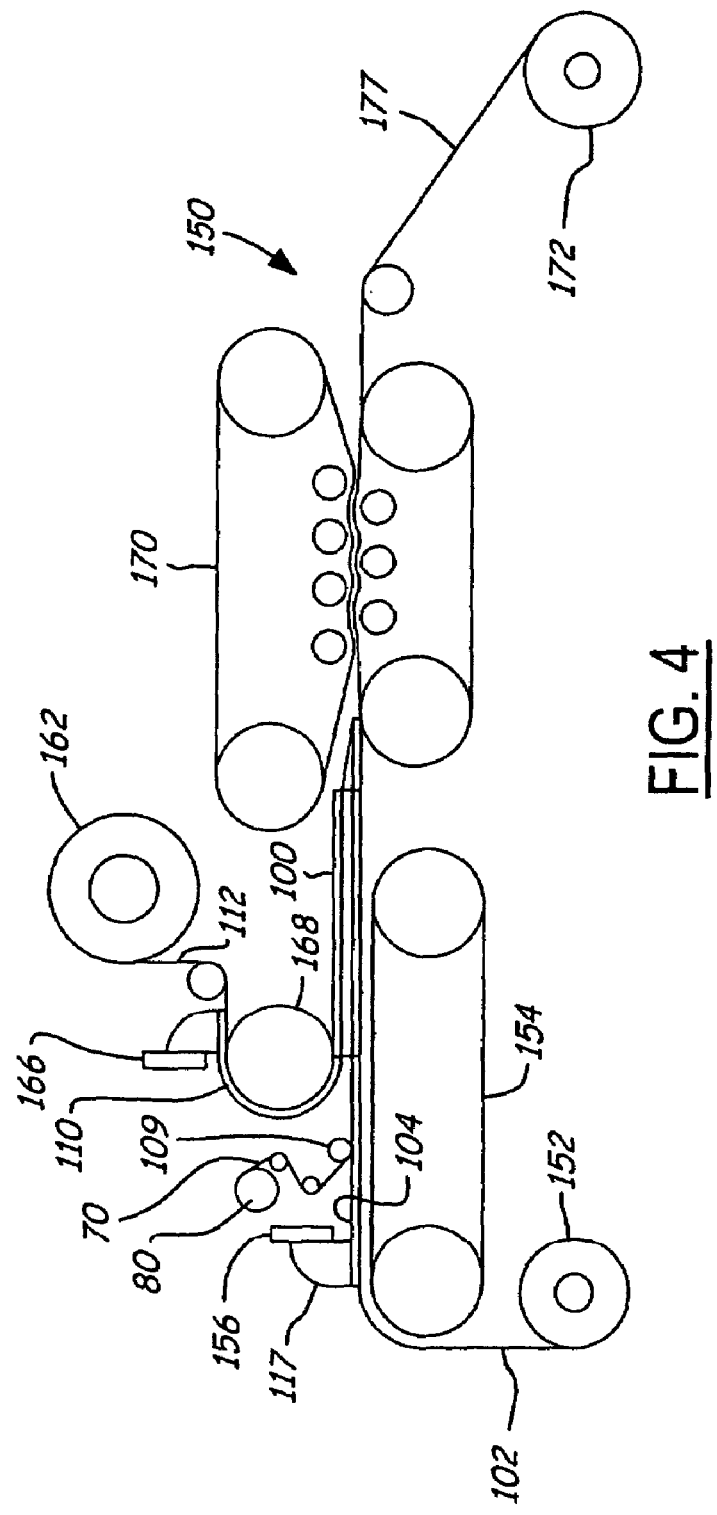
FIG. 4 is a perspective view of a processing line for forming the sheet molding composite sheet of FIG. 3.

The sheet molding composite sheet 100 of the present invention may then be formed using traditional sheet molding techniques and equipment as are well known in the industry as shown in FIG. 4. First, a layer of carrier film 102 is unrolled from a roller 152 and onto a conveyor 154. A first layer of resin paste 104 is dispensed onto the carrier film 102 from a dispensing device 117 having a doctor blade 156 to a thickness of between 0.0127 and 0.3048 centimeters (0.05 and 0.12 inches) thick. The veil 70 is unrolled from tube 80 onto the first layer of resin paste 104.

A second layer of resin paste 110 that is metered onto a lower carrier film 112 by a second metering device 127 and doctor blade 166 at a thickness between 0.0127 and 0.3048 centimeters (0.05 and 0.12) inches thick. A lower carrier film 112 is then unrolled from roller 162. The second layer of resin paste 110 and lower carrier film 112 are then rolled around roller 168 and applied to the veil 70 such that the second layer of resin paste 110 is between the veil 70 and lower carrier film 112.

The layers 104, 110 may be dispensed ("metered") using many different techniques other than as described in FIG. 4. These include using extrusion dies and or through the use of a modified paste dispenser that reduces air entrapment as the paste is "rolling" behind the metering device, some of which are described in commonly-assigned U.S. patent application Ser. No. 09/993,435, which is incorporated herein by reference in its entirety.

The sheet molding composite sheet 100 is then formed by running the compounded material through a compaction unit 170 to squeeze the resin paste 104, 110 throughout the thickness of the composite sheet 100 and within the veil 70 to form a compacted sheet 177.

The compacted sheet 177 is rolled or festooned into a roll/box 172 and subsequently matured for 1 to 14 days, typically at approximately 29–47 degrees Celsius (85–115 degrees Fahrenheit). Additional embodiments are described in the '435 application.

The sheet molding compacted sheet 177 may then be subsequently processed to form a composite part. At the time of use, the protective carrier films 102, 112 are removed and the compacted sheet 177 is cut into blanks, or plies, of a desired shape and size. One or more plies of the compacted sheet 177 are then introduced to a mold. In most applications, multiple plies of the laminated sheets formed by traditional methods are also used in the composite structure. The laminated sheets preferably have the same resin layer composition as paste layers 104, 110 and contain chopped glass reinforcements contained between the respect paste layers. The compacted sheets 177 and laminated sheets typically comprise between about 25 and 50% of the die/tool's surface area. The compacted sheet 177 is located at a position near to the visible surface of the formed composite part.

The plies of the compacted sheets 177 and laminated sheets are then preferably compression molded to form a cured composite part. When the laminated sheets are molded, the resin and glass flow within the mold under heat and pressure to cover the entire surface of the mold. For example, the sheets may be molded in a hot matched die at around 121–163 degrees Celsius (250–325 degrees Fahrenheit) for approximately 30 to 300 seconds to cure the composite part (not shown). Preferably the plies are cut to cover typically between 25 and 50% of the die/tool's surface area. When the laminated sheets are molded, the resin and glass must flow within the mold under heat and pressure to cover the entire surface of the mold. Therefore, a veil according to the present invention must flow with the resin to cover the entire mold, without tearing (i.e. without developing holes which would be visible in the finished part). In many cases the veil must flow, or elongate, over 50% of its original length and/or width, and preferably between 100–400% of its initial size (to cover 100% of the die), or more. Accordingly, the veil must flow with the charge and remain substantially intact (without holes or tears).

During the curing process, the polystyrene binder 55 component of the veil 70 is readily and substantially dissolved within the paste layers 104, 110 and other paste layers of the laminated sheets, thus allowing the fibers 50 contained within the veil 70 to flow well under pressure. Substantially dissolved, for the purposes of the present invention, is understood to mean that at least about 90 percent of the binder 55 is dissolved in paste layers 104, 110 during the curing process.

This forms a composite part having good binder and fiber distribution, thereby producing a flexible, soft, and deformable composite part as compared with other polyester or polystyrene-acrylate bound veils due to the increased solubility of polystyrene as compared to polyester or polystyrene-acrylate resins. Also, because of the entanglement of the long fibers 50, fiber prominence at the visible surface of the composite part is decreased, which improves the smoothness of the visible surface of the composite part. This same entanglement increases the loft of the formed parts. Alternatively fibers other than glass fibers, such as synthetic, mineral, metal, or natural fibers may be used with the principles of the present invention, alone or in any suitable combination.

While the invention has been described in terms of preferred embodiments, it will be understood, of course, that the invention is not limited thereto since modifications may be made by those skilled in the art, particularly in light of the foregoing teachings.

What is claimed is:

1. A conformable veil comprising:
    a plurality of fibers having an average length of between approximately 0.5 and 2 meters; and
    a polystyrene-based binder applied to said plurality of fibers, said polystyrene-based binder being substantially soluble in a sheet molding compound resin paste.

2. The conformable veil of claim 1, wherein said plurality of fibers have an average length of between approximately 1 and 2 meters.

3. The conformable veil of claim 2, wherein said polystyrene-based binder comprises approximately 10 percent of the total weight of said conformable veil.

4. The conformable veil of claim 3, wherein said plurality of fibers comprises a plurality of glass fibers.

5. The conformable veil of claim 2, wherein said polystyrene-based binder is formed from a polystyrene-based emulsion in water.

6. The conformable veil of claim 2, wherein when said veil is compression molded, said binder is substantially dissolved in a resin, and said veil elongates wherein said plurality of fibers have an average fiber diameter of between approximately 11 and 14 micrometers.

7. The conformable veil of claim 2, wherein said veil, when compression molded, elongates over 50% without any visible holes or tears.

8. The conformable veil of claim 7, wherein said veil, when compression molded, elongates over 100% without any visible holes or tears.

9. The conformable veil of claim 8, wherein said veil, when compression molded, elongates over about 400% without any visible holes or tears.

10. A conformable veil comprising:
    a plurality of fibers having an average length of between approximately 0.5 and 3 meters; and
    a polystyrene-based binder applied to said plurality of fibers, said polystyrene-based binder being substantially soluble in a sheet molding compound resin paste.

11. The conformable veil of claim 10, wherein said plurality of fibers have an average length of between approximately 1 and 2 meters.

12. The conformable veil of claim 10, wherein said polystyrene-based binder comprises approximately 10 percent of the total weight of said conformable veil.

13. The conformable veil of claim 10, wherein said plurality of fibers comprises a plurality of glass fibers.

14. The conformable veil of claim 10, wherein said polystyrene-based binder is formed from a polystyrene-based emulsion in water.

15. The conformable veil of claim 10, wherein when said veil is compression molded, said binder is substantially dissolved in a resin, and said veil elongates wherein said plurality of fibers have an average fiber diameter of between approximately 11 and 14 micrometers.

16. The conformable veil of claim 10, wherein said veil, when compression molded, elongates over 50% without any visible holes or tears.

17. The conformable veil of claim 10, wherein said veil, when compression molded, elongates over 100% without any visible holes or tears.

18. The conformable veil of claim 10, wherein said veil, when compression molded, elongates over about 400% without any visible holes or tears.

19. A conformable veil comprising:
    a plurality of fibers having an average length of between approximately 1 and 3 meters; and
    a polystyrene-based binder applied to said plurality of fibers, said polystyrene-based binder being substantially soluble in a sheet molding compound resin paste.

20. The conformable veil of claim 19, wherein said plurality of fibers have an average length of between approximately 2 and 3 meters.

21. The conformable veil of claim 19, wherein said polystyrene-based binder comprises approximately 10 percent of the total weight of said conformable veil.

22. The conformable veil of claim 19, wherein said plurality of fibers comprises a plurality of glass fibers.

23. The conformable veil of claim 19, wherein said polystyrene-based binder is formed from a polystyrene-based emulsion in water.

24. The conformable veil of claim 19, wherein when said veil is compression molded, said binder is substantially dissolved in a resin, and said veil elongates wherein said plurality of fibers have an average fiber diameter of between approximately 11 and 14 micrometers.

25. The conformable veil of claim 19, wherein said veil, when compression molded, elongates over 50% without any visible holes or tears.

26. The conformable veil of claim 19, wherein said veil, when compression molded, elongates over 100% without any visible holes or tears.

27. The conformable veil of claim 19, wherein said veil, when compression molded, elongates over about 400% without any visible holes or tears.

* * * * *